Patented Dec. 6, 1938

2,139,256

UNITED STATES PATENT OFFICE 2,139,256

PARASITICIDAL COMPOSITION

Euclid W. Bousquet, Wilmington, Del., assignor, by mesne assignments, to E. I. du Pont de Nemours & Company, Wilmington, Del., a corporation of Delaware No Drawing. Application April 15, 1935, Serial No. 16,407

1 Claim. (Cl. 167—22)

The present invention relates to compositions for combating parasites thriving on vegetable growths and relates to spreaders to be used in connection with toxic substances, such spreaders being amine salts of sulfated aliphatic alcohols of at least 8 carbon atoms.

The use of my novel spreaders results in improved compositions with better spreading, adhesion and distribution over the plants upon which the dry or liquid preparations containing the spreaders are distributed.

One particular advantage of my novel spreaders is that they are compatible with the commonly used insecticides and fungicides.

Another very valuable property of these spreaders is their solubility in oily substances, such as petroleum oils commonly used in insecticidal compositions. They are also soluble in the oily rhodanates of alcohols of high molecular weight which are coming into prominence as valuable parasiticides. Whether or not these spreaders form true molecular solutions or merely micellar or colloidal solutions with such oily substances cannot be stated with certainty. In either event, whether an oily substance is used as a carrier for an oil-soluble toxic substance or whether an oily toxic substance is used without such a carrier, the spreader and the toxic substance become intimately associated, either in molecular or micellar admixture. Such intimate association imparts improved wetting and penetrating properties resulting in higher efficiency. Moreover, it imparts improved dispersing properties so that suspension or emulsions may be prepared without having to resort to the violent agitation required for dispersing oily substances with the usual water-soluble dispersing agents.

As far as I have been able to ascertain, the organic amines have broadly the property to form salts with sulfated higher alcohols and these salts have in all instances been found useful in parasiticidal compositions. The amines from which such salts can be prepared are, for instance, aliphatic amines: mono, di, tri methyl amine, ethylamines, propylamines, butylamines, ethanolamines, etc., alicyclic amines such as cyclohexylamine, mono- and di methyl cyclohexylamine, saturated heterocyclic amines, such as piperidine, hexahydro-picoline, etc.; aromatic amines such as aniline, the toluidines, xylidines, etc.; heterocyclic benzenoid amines such as pyridine and quinoline, etc.

The acids combined with the above amines to form my novel spreaders are the sulfation products of the aliphatic alcohols, and esters and ethers of aliphatic alcohols of at least 8 carbon atoms. Such products, particularly in the form of their alkali metal salts, are well known in the arts as described, for instance, in U. S. Patents 1,968,793, 1,968,794, 1,968,795, 1,968,796, 1,968,797, etc.

The higher alcohols (of at least 8 carbon atoms) which by sulfation produce the new acids used herein to form amine salts are, for instance, octyl, nonyl, decyl, dodecyl (or lauryl), oleyl, cetyl, stearyl, myristyl, ricinoleyl, linoleyl, batyl, selachyl, etc., alcohols.

The sulfation reaction results in true sulfonates in which the —$SO_3H$ group is directly attached to carbon or in sulfuric acid esters of the formula R—O—$SO_3H$, in which R is a hydrocarbon radical containing at least 8 carbon atoms. For matter of convenience these sulfation products are generally called "sulfates", and this term is to be understood to include sulfuric acid esters as well as sulfonic acids.

Under this term "sulfates" I also include the sulfonates in which the alcoholic group is esterified, either before or after sulfonation and these compounds are included within the scope of my present invention and claims.

The aliphatic alcohols of at least 8 carbon atoms can be esterified with various inorganic and organic acids, such as boric, formic, acetic, benzoic, phthalic, etc. and such esters on treatment with sulfuric acid produce true sulfonates which in the form of their amines are very useful in my present invention.

Amine salts of sulfated ethers in which the aliphatic alcohols of at least 8 carbon atoms are etherified with polyhydroxy aliphatic alcohols, are also very valuable spreaders for use in my invention.

While mono alcohols form simple ethers the etherification of poly alcohols such as ethyleneglycol or glycerol leads to mono and poly ethers. On treatment of such ethers with concentrated sulfuric acid, oleum or chlorosulfonic acid the sulfo group is introduced into either alcoholic group and sulfonic acids are obtained which on neutralization with amines form the amine salts useful in my invention.

My novel spreaders are mixed with or dissolved together with the toxic compound to form my preferred parasiticides.

With mineral toxic compounds such as the arsenicals, fluorine compounds, I mix one or more per cent of the amine salt with the insecticide for use as a dry dust or a liquid spray suspension. It is found that such mixtures are distributed more uniformly and adhere better than the insecticide in which my amine salts have been omitted.

Parasiticides which can thus be improved are, for instance, nicotine sprays; nicotine sulfate or tannate; pyrethrum; rotenone; quassia extract; hellebore; mineral oil suspensions; sodium fluoride; cryolite; barium fluosilicate, calcium arsenate, lead arsenate; magnesium arsenate; manganese arsenate; lime sulfur; sodium sulfide; Paris green; Bordeaux mixtures; flotation sulfur; copper carbonate; copper oxychloride; etc. These novel spreaders are also particularly useful in combination with synthetic parasiticides, such as lauryl rhodanate, cetyl rhodanate, lauryl xanthate, thiazoles, such as mercaptobenzo-thiazole, particularly those like lauryl rhodanate which are oily liquids at ordinary temperature and in which the amine salts are soluble. In such cases I dissolve, for instance, 1 part cyclohexyldiethylammonium lauryl sulfate in 1 part of lauryl thiocyanate which products form a stable emulsion with water which does not precipitate in hard water and can be used as an efficient plant spray.

My novel spreaders are particularly valuable for aqueous spray compositions as they are not precipitated by hard water. They are also compatible with the other common ingredients used in parasiticidal compositions. For example, these novel amine salts can also be used in admixture with other spreading agents such as ordinary soaps, or compounds, such as triethanolamine oleate, gluc-amine laurate, esters of fatty acids with polyalcohols, such as the diethylene glycolmono-oleate or the coconut oil diglyceride, alkali metal naphthenates, etc. I may also use in conjunction with my amine salts spreaders or stickers such as sulfonated fish oil, corn, peanut, castor, pine, soy bean oils, as well as sulfonated hydrocarbons such as the sulfonated abietenes and other alkylated sulfonated aryl sulfonates including alkyl naphthalene sulfonic acids, or sulfonates derived from petroleum oils, oxidized petroleum oils and naphthenes.

Casein and its derivatives, sulfite cellulose waste, gum arabic, glue, sugars, tragacanth, resins and other protective colloids are likewise compatible with my novel spreaders and the two types can be used jointly with the toxic substances.

When diluting the toxic substance with inert carriers such as talc, flour, clay, kaolin, kieselguhr or other diatomaceous earths, or mixing the parasiticides proper with oily substances such as vegetable oils, fish oils, soya bean oil, linseed oil, or mineral oils such as kerosene, lubricating oils of various viscosities, tar oils, cresols and their derivatives, I also found that the addition of my novel spreaders consisting of amine salts of sulfates of higher alcohols produces beneficial results in that in contact with water the toxic substances are more or less released and freed from the inert carriers and spread more evenly over the materials to be treated.

While all these various spreaders, stickers, protective colloids enumerated above have been or can be used alone successfully with the organic rhodanate or other synthetic organic parasiticides, the further addition to such compositions of amine salts of sulfated alcohols of at least 8 carbon atoms improves the compositions inasmuch as they can be used as sprays with hard water or in other instances the solubility of the amine salts in oily liquids facilitates the emulsification and stabilizes the so formed emulsions.

The amounts of my novel spreaders to be used in parasiticidal compositions varies naturally from case to case. Such amounts depend much more on the amounts of vehicles to be used with the toxic composition. For aqueous suspensions of inorganic insecticides or fungicides, for instance, it is sufficient to add say from 0.01% to 1% of the amine salts based on the weight of the water to be used in the liquid sprays. For dusts it is preferable to use more of my novel spreaders and there is practically no upper limit to the amount of amine salt which can be incorporated into my improved parasiticidal compositions.

Very efficient insecticides have, for instance, been obtained by mixing organic thiocyanates with the salts of octyl, decyl, lauryl, myristyl sulfuric acid esters with amines such as piperidine, cyclohexyl dimethyl amine, dibutyl amine, etc. specifically with, for instance, cyclohexyl-diethyl ammonium lauryl sulfate, piperdinium decyl sulfate, or dibutyl ammonium myristyl sulfate. These amine salts are formed by the neutralization of the amine by the free acid group of the sulfuric acid ester. For example, cyclohexyl diethylamine and the mono sulfuric acid ester of lauryl (n-dodecyl) alcohol react by simple addition to give cyclohexyl diethyl ammonium lauryl sulfate which has the following structural formula:

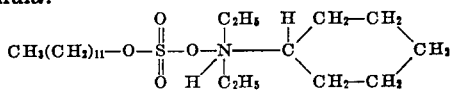

In all instances improvement in spreading, wetting, etc. properties and improved toxicity of the compositions were observed when compared with similar compositions containing the alkali metal salts of, or the free sulfuric acid esters or sulfates of the esters and ethers of the corresponding alcohols of more than 8 carbon atoms. For example, a 0.1% aqueous solution of technical sodium lauryl sulfate gave 85.3% kill of black chrysanthemum aphids as compared with 99.5% for the diethylcyclohexylamine salt. Furthermore, in combination with lauryl thiocyanate the latter gives better kills, less plant injury, and better wetting than the sodium salt of sulfated acetylated oleyl alcohol. An important, additional advantage of the amine salts as compared with alkali salts is their good solubility in oil-type insecticides such as higher alkyl thiocyanates. Unlike sodium or potassium soaps of fatty acids, or even the amine salts of fatty acids, the present agents are not precipitated by hard water.

I claim:

An emulsifiable anhydrous parasiticidal composition consisting essentially of lauryl thiocyanate and cyclohexyl diethyl ammonium lauryl sulfate in substantially equal proportions and characterized as a homogeneous solution readily dispersible in aqueous media to form stable emulsions for use as plant sprays.

EUCLID W. BOUSQUET.